United States Patent [15] 3,654,438
Wyatt et al. [45] Apr. 4, 1972

[54] HEXADECIMAL/DECIMAL CALCULATOR

[72] Inventors: Philip J. Wyatt; Albert S. Trundle; Judith B. Bruckner, all of Santa Barbara, Calif.
[73] Assignee: Science Spectrum, Santa Barbara, Calif.

[22] Filed: July 9, 1969
[21] Appl. No.: 840,251

[52] U.S. Cl. ....................235/84
[51] Int. Cl. ....................G06g 1/02
[58] Field of Search ....................235/70, 74, 78, 79.5, 83, 84, 235/85, 88

[56] References Cited

UNITED STATES PATENTS 1,214,040 1/1917 Jones ....................235/84

*Primary Examiner*—Richard B. Wilkinson
*Assistant Examiner*—Lawrence R. Franklin
*Attorney*—James E. Hawes and David Rich

[57] ABSTRACT

A calculating device comprising a base member, a plurality of graduated scales arranged on the base member, and indicator means cooperating with the scales for performing a variety of calculations. The scales are graduated in hexadecimal base numbers and decimal base numbers for use in making conventional arithmetic and algebraic operations in both hexadecimal and decimal bases and for converting between these bases.

16 Claims, 2 Drawing Figures

INVENTORS.
PHILIP J. WYATT
ALBERT S. TRUNDLE
JUDITH B. BRUCKNER

INVENTORS.
PHILIP J. WYATT
ALBERT S. TRUNDLE
JUDITH B. BRUCKNER

HEXADECIMAL/DECIMAL CALCULATOR

BACKGROUND OF THE INVENTION

1. Field of the Invention

This invention relates to calculating devices containing a plurality of scales and indicator means for establishing relations between the scales. More particularly, this invention relates to a calculator which permits the user to perform arithmetic and algebraic operations in a hexadecimal base mathematical system and to convert numbers between this base and the familiar decimal base.

2. Description of the Prior Art

The familiar system of mathematics is the so-called decimal or common system which is based upon the nine distinct integers 1, 2, 3, 4, 5, 6, 7, 8, 9 plus 0. There is a great need both from the educational and scientific point of view to be able to perform arithmetic and algebraic calculations in a system commonly referred to as hexadecimal. This system in turn is based upon the binary number system wherein all quantities are represented by combinations of the symbols "1" and "0." The binary system is particularly useful in all types of electronic circuitry and in particular digital computers since the symbol "1" may therein represent the condition "on" and the symbol "0" may represent the condition "off." For convenience, binary bits are collected in groups of four in many computers. A grouping of four binary bits is capable of representing 15 integer values, since the largest four bit number in the binary system is 1111, which is equivalent to the decimal number 15. A particular grouping of four binary bits is easily represented in terms of a hexadecimal numbering system, that is, a system which defines 15 integer values or significant digits 1, 2, 3, 4, 5, 6, 7, 8, 9, A, B, C, D, E, and F, in addition to 0.

Numbers referenced to the hexadecimal system are characterized by the subscript "16"; and decimal system numbers are characterized by the subscript "10." The smallest two-digit number in the hexadecimal system is 10, which is equivalent to the decimal number 16. Thus, the hexadecimal system defines 15 distinct integers between 0 and $10_{16}$, just as the decimal system defines nine integers between 0 and $10_{10}$; and a scale of hexadecimal numbers from 1 to $10_{16}$ is divided into 15 major divisions corresponding to the above 15 distinct integers.

During batch processing, the memory of a computer is often dumped to permit a careful examination by programmers or systems analysts. This dumping process is most easily performed in a hexadecimal system if the computer collects binary bits in groups of four. Typically, the recipient of such a dump listing must interpret the operations of the machine program in terms of the more familiar decimal numbering system. The conversion between the decimal and hexadecimal base systems is a difficult procedure and limits the usefulness of dump listings. It would be ideal if the machine user were able to be as conversant in a hexadecimal system as he is in a decimal system. If this were possible, he would not be concerned with the conversion between the two bases. The current invention permits the user to perform most algebraic and arithmetic operations in a hexadecimal base and convert between hexadecimal and decimal.

In addition to the above usefulness of this invention to the computer programmer and systems engineer, it is a particularly useful tool for teaching the basic concepts of mathematics. For example, the fundamental operations of arithmetic and algebra are independent of the numerical base used. Unfortunately, these concepts are often taught in a manner which leads the student to believe that they are only valid in the familiar decimal system. With the present invention, the instructor may demonstrate many important arithmetic and algebraic principles in the less familiar hexadecimal base and then compare the final answers with the decimal results. Further, it is often useful for an instructor to convert numbers in an unfamiliar system, such as hexadecimal, to a decimal system when explaining the basic relationships between number systems. The calculator of this invention enables the instructor to perform calculations in the hexadecimal system and convert to decimal rapidly and accurately, thereby improving his teaching proficiency.

It should be appreciated that there are no known tables in existence of the hexadecimal logarithms of hexadecimal numbers, expressed in hexadecimal. Since these tables do not exist, the performance of various algebraic and trigonometric operations in hexadecimal base is particularly difficult even to one skilled in the art. With the present invention, however, referral to such tables becomes unnecessary and the aforementioned operations are readily performed. The multiplication, addition, subtraction, and division operations involving hexadecimal numbers have, until this time, been performed by means of elaborate tables and procedures, most of which are usually referred back to a decimal base. The present invention makes even the most difficult calculations in hexadecimal base relatively simple to perform.

SUMMARY OF THE INVENTION

Generally speaking, the calculator of this invention includes a base member and a hexadecimal base scale thereon having hexadecimal numbers graduated in ascending order. The numbers are arranged to divide the length of the scale into a plurality of segments defined by indicia corresponding to the hexadecimal numbers 1 through 10. The indicia are preferably arranged to divide the scale into 15 major segments, with each segment having graduations corresponding to fractional portions of each of the above hexadecimal numbers. The relative positions of the numbers with reference to the origin of the scale are a function of the hexadecimal logarithm of each number. Indicator means movable relative to the base member are provided for adding intervals corresponding to selected portions of the scale and indicating a resultant value thereon.

Preferably, the relative positions of the hexadecimal base numbers with reference to the origin of the scale are determined by the relationship $L(\log_{10}X)\log_{16}10)$, where X is the decimal representation of a hexadecimal number between 1 and 10 whose position on the scale is to be determined, and L is a quantity representing the effective length of the scale. For a linear scale, L represents the full length of the scale in inches or centimeters for example, and for a circular scale, L represents 360°. The hexadecimal base scale enables the user of the calculator to perform conventional multiplication and division of hexadecimal base numbers rapidly and accurately. The savings of time is substantial when considering that simple multiplication of two hexadecimal base numbers requires searching hexadecimal multiplication tables for the products of single hexadecimal integers and then carrying and adding in a manner prescribed by hexadecimal addition relations. This procedure is time-consuming even if tables of hexadecimal multiplication and addition are available.

This invention further includes a series of various scales for use in combination with the aforementioned hexadecimal base scale to permit multiplication, division, exponentiation, squaring, and the taking of square roots and logarithms in, with respect to, and expressed in a hexadecimal base. An inverse hexadecimal base scale having an effective length equal to that of the above-described hexadecimal base scale is provided with hexadecimal base numbers graduated in the same manner as the hexadecimal base scale, but in the reverse direction. The numbers on the inverse hexadecimal base scale preferably are arranged to logarithmically divide the length of the scale into 15 major segments, with indicia corresponding to the hexadecimal numbers 1 through 10. The indicator means of this invention is movable relative to the base means for adding intervals corresponding to selected portions of either the hexadecimal base or the inverse hexadecimal base scale and indicating resultant values on either of the scales. The inverse hexadecimal base scale is particularly useful in performing multiple operations in hexadecimal involving several multiplications and divisions without the necessity of recording partial products or quotients.

This invention also includes a hexadecimal square scale having an effective length equal to that of the hexadecimal base scale and containing two successive hexadecimal base scales. The two scale sections are of equal length, and each section is further divided logarithmically into a plurality of segments defined by indicia corresponding to the hexadecimal numbers 1 through 10. The hexadecimal square scale is useful in calculating the squares of hexadecimal numbers selected from the hexadecimal base scale. Conversely, square roots of hexadecimal numbers selected from the hexadecimal square scale are located on the hexadecimal base scale. The hexadecimal square scale is especially useful because the manual taking of square roots is a complex process, particularly in view of the difficulty in manually dividing and carrying numbers in the unfamiliar hexadecimal base system.

This invention further provides a hexadecimal logarithm scale for use in combination with the hexadecimal base scale. The hexadecimal logarithm scale has hexadecimal base numbers linearly graduated in ascending order and preferably arranged to divide the scale into 16 segments of equal length. The scale's primary indicia correspond to the hexadecimal fractions between 0 and 1, that is, 0, .1, .2, .3, .4, .5, .6, .7, .8, .9, .A, .B, .C, .D, .E, .F, and 1.0. The hexadecimal logarithm scale is used to calculate hexadecimal mantissas of hexadecimal logarithms of numbers selected from the hexadecimal base scale. The scale may also be used to calculate exponentials of hexadecimal numbers in hexadecimal. The hexadecimal logarithm scale is further used in combination with a collinear decimal logarithm scale (a linear representation of the decimal fractions between 0 and 1.0) and an indicator means to convert fractions between the hexadecimal and decimal bases. Furthermore, fixed point addition and subtraction to three significant figures in hexadecimal, if desired, is performed using the hexadecimal logarithm scale.

In order to represent a broad range of numbers, the so-called floating-point notation is used by mathematicians and computers alike. In this description a number is represented as a fraction times a power of the base; for example, the decimal base number 684 would be represented as $0.684 \times 10^3$. In a binary system the number 11001.11 would be represented as $0.1100111 \times 10^{101}$, where latter factor 10 is the binary representation of the number 2, that is, the base of the binary system. The exponent 101 is the binary representation of the hexadecimal (and decimal) number 5 which corresponds to number of positions that the binary point has been moved to the left. A number of computers operate in a binary system but express results in a hexadecimal base; that is, a floating-point number is represented in memory as a hexadecimal fraction between 0.1 and 1.0 times a hexadecimal power of $10_{16}$. Such numbers are said to be in "normalized" form. The present invention reduces the conversion of the exponents of such numbers to simple and rapid operations by means of a hexadecimal powers of ten scale used in combination with a conventional decimal base scale, i.e., a "C" or "D" scale. This scale is useful in converting hexadecimal powers of the factor $10_{16}$ into their decimal equivalents. Conversion of extremely large and extremely small floating-point numbers between the decimal and hexadecimal bases is often difficult and time-consuming because the decimal equivalent of a hexadecimal power of $16_{10}$, i.e., $10_{16}$ is not readily calculated. The hexadecimal powers of ten scale reduces such conversions to very simple and accurate operations.

This invention further contemplates use of decimal conversion scales in combination with the hexadecimal base scale for converting hexadecimal numbers to decimal numbers and vice versa. Each decimal conversion scale has an effective length equal to that of the hexadecimal base scale, and has decimal base numbers graduated in ascending order from $16^{M-1}$ to $16^M$, where M may represent any integer including 0. A preferable range of scales includes the integers from −3 to +4. The relative positions of the numbers with reference to the scale are a function of the hexadecimal logarithm of each number. In use, fixed-point decimal multiplication and division can be performed using the decimal conversion scales, and resultant decimal values can be immediately converted to their respective hexadecimal equivalents on the hexadecimal base scale. Conversely, hexadecimal multiplication and division can be performed using the hexadecimal base scale, with resultant values being converted immediately into their decimal equivalents on the decimal conversion scales.

BRIEF DESCRIPTION OF THE DRAWINGS

The features of a specific embodiment of the best mode contemplated of carrying out the invention are illustrated in the drawings, in which.

DETAILED DESCRIPTION OF THE SPECIFIC EMBODIMENT

Figure 1:
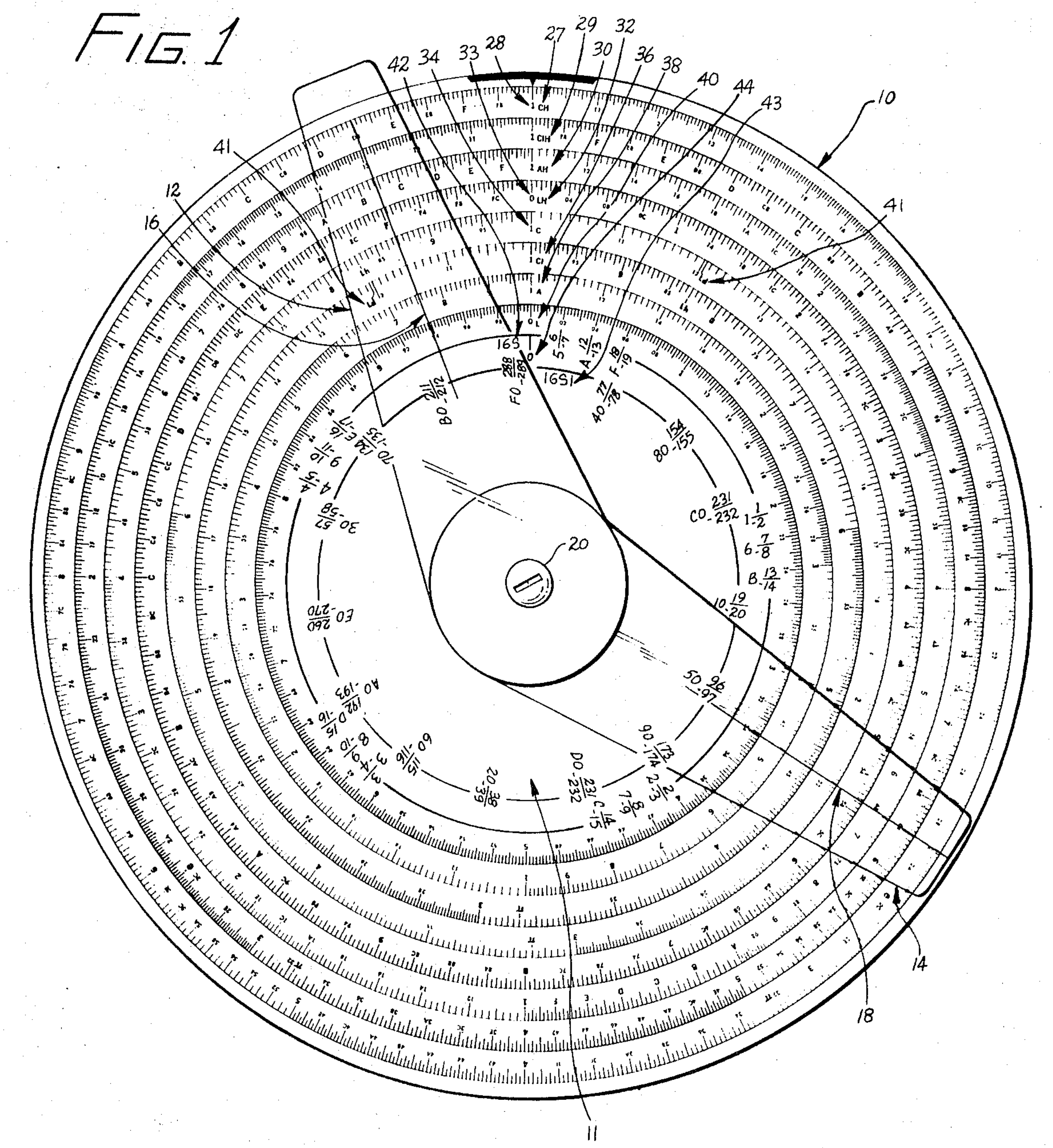
FIG. 1 is an elevational view showing one face of a circular version of the calculating device of this invention having thereon the hexadecimal base, inverse hexadecimal base, hexadecimal square, hexadecimal logarithm, and hexadecimal powers of 10 scales in combination with decimal base scales ordinarily used in conventional slide rules.
Figure 2:
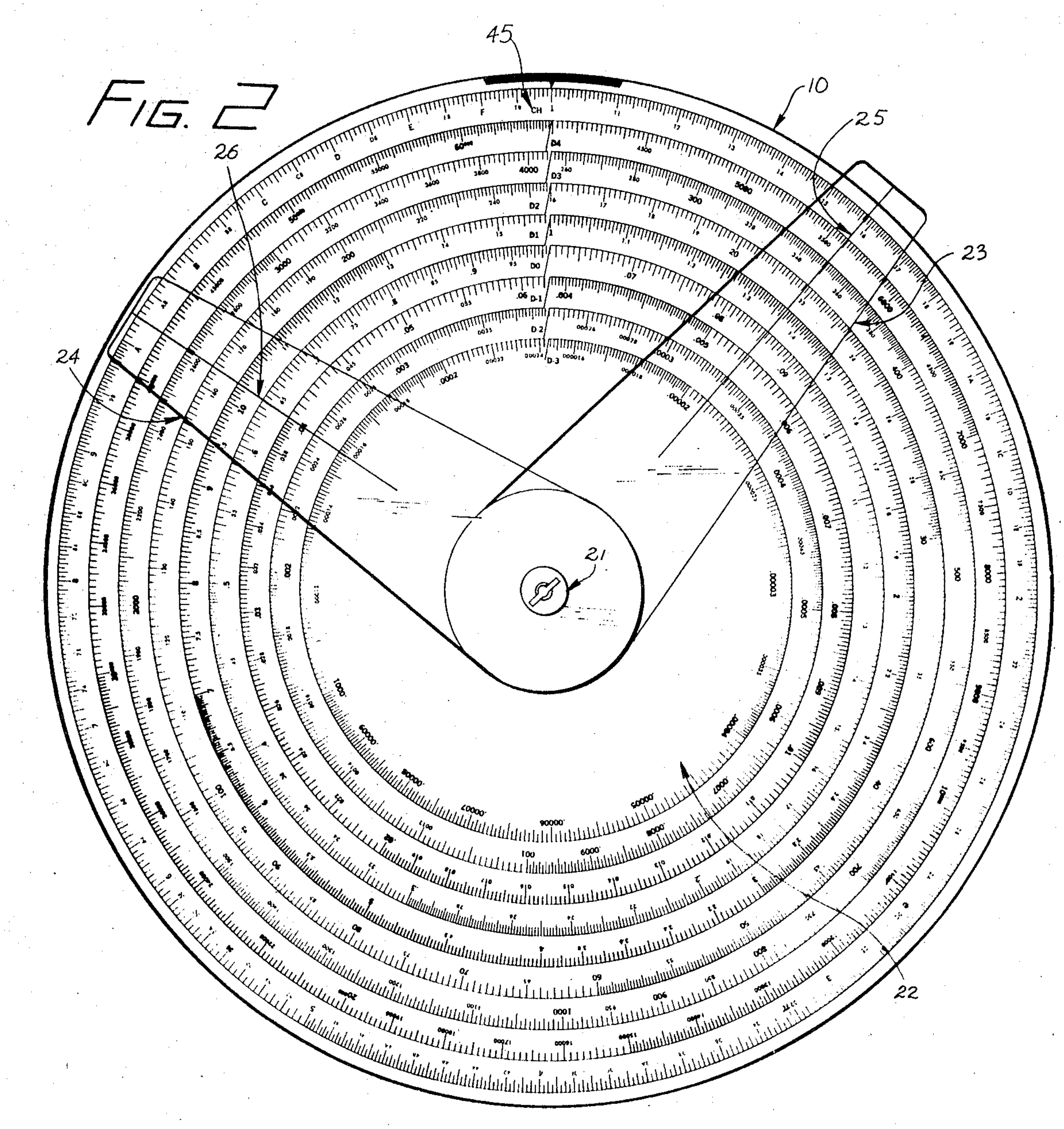
FIG. 2 is an elevational view showing the reverse face of the calculating device of FIG. 1 having thereon the hexadecimal base scale and decimal conversion scales of this invention.

Referring to the drawings, the calculating device of this invention includes a flat circular base member 10 having a front face 11 and a pair of indicator arms 12 and 14 extending outwardly from the center of face 11. Arms 12 and 14 preferably comprise thin transparent plastic plates respectively provided with elongated centrally disposed hairlines 16 and 18. The indicator arms are secured to the center of base member 10 by an externally threaded screw 20 which extends through holes in the indicator arms and through a centrally disposed hole in the base member for engagement with an internally threaded fastening member 21 on an opposing reverse face 22 of base member 10. A pair of similarly constructed indicator arms 23 and 24 respectively provided with centrally disposed hairlines 25 and 26 are secured to the center of reverse face 22. Indicator arms 12, 14, 23 and 24 are movable relative to base member 10. Preferably, indicator arm 12 is slightly longer than arm 14, and arm 12 is mounted adjacent to face 11 of base member 10 with arm 14 overlapping arm 12. Arms 12 and 14 move as a unit when arm 12 is rotated, but arm 12 remains stationary when arm 14 is moved. Similarly, indicator arm 23 is longer than arm 24 and is mounted adjacent to reverse face 22 with arm 24 overlapping arm 23. Arms 23 and 24 move as a unit when arm 23 is rotated, but arm 23 remains stationary when arm 24 is moved.

Referring to FIG. 1, a plurality of inwardly converging, concentric scales in accordance with this invention are located on face 11 of base member 10. While this arrangement of scales is preferred from a practical operating standpoint, it will be understood that application of the principles of the invention to linear slide rule structures, for example, is possible. As shown in FIG. 1, a circular hexadecimal base scale having a label CH at 27 is located adjacent the outer periphery of base member 10. The CH scale is graduated in accordance with the hexadecimal logarithms of hexadecimal numbers from 1 through 10. The scale extends 360° around the face of base member 10, and the origin 1 and end $10_{16}$ of the scale are defined by an index numeral "1" indicated at 28. As shown in FIG. 1, the CH scale is divided into 15 primary segments by indices representing the 15 hexadecimal numbers 1, 2, 3, 4, 5, 6, 7, 8, 9, A, B, C, D, E and F. Each of these segments is preferably divided into 16 secondary segments corresponding to the set of possible second significant hexadecimal figures 1, 2, 3, 4, 5, 6, 7, 8, 9, A, B, C, D, E, F and 0. Each of these segments is further divided into smaller segments. When using the CH scale, the location of three-significant-figures numbers is determined by interpolating in the hexadecimal number system. Thus, for example, the hexadecimal number 4.8 lies approximately halfsway between the indices defining 4.0 and 5.0; and the number B3C appears approximately three-fourths of the way between the indices B3 and B4.

The angular locations $Y$ of the CH scale indicia (expressed in the familiar decimal degree manner) are given by the formula $$Y^\circ = 360^\circ (\log_{10} X)(\log_{16} 10)$$

where $X$ represents a real decimal number between 1 and 16 corresponding to a hexadecimal number between 1 and $10_{16}$. The hexadecimal number $10_{16}$ is equivalent to the decimal number 16. Corresponding to each value of $X$ whose indicial location $Y$ is desired is a label $\xi$. This label is the hexadecimal value corresponding to the decimal number $X$. Thus, for example,

| X (decimal | $\xi$(hexadecimal) | (to three significant figures) |
|---|---|---|
| 1 | 1 | |
| 1.71 | 1.B5C | |
| 8 | 8 | |
| 11.75 | B.C | |
| 15 | F | |

$Y$ represents the angular displacement of the number $X$ (whose hexadecimal representation is $\xi$) from the CH scale index in decimal degrees. If the factor 360° is replaced by $L$ where $L$ is the total length of a linear CH scale in inches or centimeters, for example, then $$Y = L (\log_{10} X)(\log_{16} 10)$$

yields the distance $Y$ of a given decimal value $X$ from the origin of such a linear embodiment of the calculator.

The CH scale is primarily used in performing hexadecimal base multiplication and division operations. The multiplication of the two numbers $x$ and $y$ is achieved by first setting hairline 16 of indicator arm 12 at $x$ on the CH scale, and then setting hairline 18 of indicator arm 14 at the index 1 on the same scale. Next, the hairline of indicator arm 12 is moved until the hairline of arm 14 is at $y$. The result appears beneath the hairline of arm 12 on the same scale.

EXAMPLE A:

Evaluate $9A.8_{16} \times 1.C4_{16}$

This problem is solved by the calculator as follows:

Set hairline 16 of indicator arm 12 at 9A8 on the CH scale.

Move hairline 18 of arm 14 to index 1 on the CH scale.

Move arm 12 until hairline 16 of arm 14 is at 1C4 on the CH scale.

Read 111 at hairline 16 of arm 12 on the CH scale. Thus, $9A.8_{16} \times 1.C4_{16} = 111_{16}$ (to three significant figures).

The fractional point of the product of hexadecimal numbers is often difficult to locate because of unfamiliarity with the hexadecimal system. Location of the fractional point is readily obtained by the calculator of this invention as follows:

Express each factor to be multiplied as a normalized floating-point number, i.e., $9A.8 = 0.9A8 \times 10_{16}^2$.

Follow the multiplication procedure as described above, with the final movement of indicator arm 12 in the clockwise direction.

If hairline 16 passes index 1 during this final movement, the first significant figure of the product of the factors multiplied is immediately to the right of the fractional point.

If hairline 16 does not pass the index, the fractional point and the first significant figure are separated by a 0.

In the example above, if arm 12 is moved clockwise when setting arm 14 at 1C4, hairline 16 passes index 1.

The first significant figure is to the right of the hexadecimal point. Thus, $(0.9A8 \times 10_{16}^2) \times (0.1C4 \times 10_{16}^1) = 0.111_{16} \times 10_{16}^3 = 111_{16}$ EXAMPLE B: Evaluate $64_{16} \times 2.1_{16}$.

Re-express: $(0.64 \times 10_{16}^2) \times (0.21 \times 10_{16}^1)$.

Set hairline 16 of arm 12 at 64 on the CH scale and hairline 18 of arm 14 at 1.

Move arm 12 clockwise until hairline 18 is at 21 on the CH scale.

Read CE4 at hairline 16 on the CH scale.

During the clockwise movement of arm 12, hairline 16 does not pass 1. Therefore a 0 is placed between the hexadecimal point and the first significant figure, i.e., $0.64_{16} \times 0.21_{16} \times 10_{16}^3 = 0.0CE4 \times 10_{16}^3 = 0.CE4 \times 10_{16}^2$.

It will be appreciated that solving the above problems is extremely difficult and time-consuming at present without the aid of this invention, because it requires a familiarity with the hexadecimal multiplication table:

| X | 1 | 2 | 3 | 4 | 5 | 6 | 7 | 8 | 9 | A | B | C | D | E | F | 10 |
|---|---|---|---|---|---|---|---|---|---|---|---|---|---|---|---|---|
| 1 | 1 | 2 | 3 | 4 | 5 | 6 | 7 | 8 | 9 | A | B | C | D | E | F | 10 |
| 2 | 2 | 4 | 6 | 8 | A | C | E | 10 | 12 | 14 | 16 | 18 | 1A | 1C | 1E | 20 |
| 3 | 3 | 6 | 9 | C | F | 12 | 15 | 18 | 1B | 1E | 21 | 24 | 27 | 2A | 2D | 30 |
| 4 | 4 | 8 | C | 10 | 14 | 18 | 1C | 20 | 24 | 28 | 2C | 30 | 34 | 38 | 3C | 40 |
| 5 | 5 | A | F | 14 | 19 | 1E | 23 | 28 | 2D | 32 | 37 | 3C | 41 | 46 | 4B | 50 |
| 6 | 6 | C | 12 | 18 | 1E | 24 | 2A | 30 | 36 | 3C | 42 | 48 | 4E | 54 | 5A | 60 |
| 7 | 7 | E | 15 | 1C | 23 | 2A | 31 | 38 | 3F | 46 | 4D | 54 | 5B | 62 | 69 | 70 |
| 8 | 8 | 10 | 18 | 20 | 28 | 30 | 38 | 40 | 48 | 50 | 58 | 60 | 68 | 70 | 78 | 80 |
| 9 | 9 | 12 | 1B | 24 | 2D | 36 | 3F | 48 | 51 | 5A | 63 | 6C | 75 | 7E | 87 | 90 |
| A | A | 1A | 1E | 28 | 32 | 3C | 46 | 50 | 5A | 64 | 6E | 78 | 82 | 8C | 96 | A0 |
| B | B | 16 | 21 | 2C | 37 | 42 | 4D | 58 | 63 | 6E | 79 | 84 | 8F | 9A | A5 | B0 |
| C | C | 18 | 24 | 30 | 3C | 48 | 54 | 60 | 6C | 78 | 84 | 90 | 9C | A8 | B4 | C0 |
| D | D | 1A | 27 | 34 | 41 | 4E | 5B | 68 | 75 | 82 | 8F | 9C | A9 | B6 | C3 | D0 |
| E | E | 1C | 2A | 38 | 46 | 54 | 62 | 70 | 7E | 8C | 9A | A8 | B6 | C4 | D2 | E0 |
| F | F | 1E | 2D | 3C | 4B | 5A | 69 | 78 | 87 | 96 | A5 | B4 | C3 | D2 | E1 | F0 |
| 10 | 10 | 20 | 30 | 40 | 50 | 60 | 70 | 80 | 90 | A0 | B0 | C0 | D0 | E0 | F0 | 100 |

(To calculate partial products; and the hexadecimal addition table:)

| + | 1 | 2 | 3 | 4 | 5 | 6 | 7 | 8 | 9 | A | B | C | D | E | F | 10 |
|---|---|---|---|---|---|---|---|---|---|---|---|---|---|---|---|---|
| 1 | 2 | 3 | 4 | 5 | 6 | 7 | 8 | 9 | A | B | C | D | E | F | 10 | 11 |
| 2 | 3 | 4 | 5 | 6 | 7 | 8 | 9 | A | B | C | D | E | F | 10 | 11 | 12 |
| 3 | 4 | 5 | 6 | 7 | 8 | 9 | A | B | C | D | E | F | 10 | 11 | 12 | 13 |
| 4 | 5 | 6 | 7 | 8 | 9 | A | B | C | D | E | F | 10 | 11 | 12 | 13 | 14 |
| 5 | 6 | 7 | 8 | 9 | A | B | C | D | E | F | 10 | 11 | 12 | 13 | 14 | 15 |
| 6 | 7 | 8 | 9 | A | B | C | D | E | F | 10 | 11 | 12 | 13 | 14 | 15 | 16 |
| 7 | 8 | 9 | A | B | C | D | E | F | 10 | 11 | 12 | 13 | 14 | 15 | 16 | 17 |
| 8 | 9 | A | B | C | D | E | F | 10 | 11 | 12 | 13 | 14 | 15 | 16 | 17 | 18 |
| 9 | A | B | C | D | E | F | 10 | 11 | 12 | 13 | 14 | 15 | 16 | 17 | 18 | 19 |
| A | B | C | D | E | F | 10 | 11 | 12 | 13 | 14 | 15 | 16 | 17 | 18 | 19 | 1A |
| B | C | D | E | F | 10 | 11 | 12 | 13 | 14 | 15 | 16 | 17 | 18 | 19 | 1A | 1B |
| C | D | E | F | 10 | 11 | 12 | 13 | 14 | 15 | 16 | 17 | 18 | 19 | 1A | 1B | 1C |
| D | E | F | 10 | 11 | 12 | 13 | 14 | 15 | 16 | 17 | 18 | 19 | 1A | 1B | 1C | 1D |
| E | F | 10 | 11 | 12 | 13 | 14 | 15 | 16 | 17 | 18 | 19 | 1A | 1B | 1C | 1D | E1 |
| F | 10 | 11 | 12 | 13 | 14 | 15 | 16 | 17 | 18 | 19 | 1A | 1B | 1C | 1D | 1E | 1F |
| 10 | 11 | 12 | 13 | 14 | 15 | 16 | 17 | 18 | 19 | 1A | 1B | 1C | 1D | 1E | 1F | 20 |

for the carrying and addition of hexadecimal numbers.

The CH scale is used for division of hexadecimal numbers in a manner analogous to multiplication:

EXAMPLE C: $376_{16}\ 5A_{16}$.

Set arm 12 at 376 and arm 14 at 5A both on the CH scale.

Move arm 12 until arm 14 is at 1.

Read 9D7 at arm 12 on the CH scale. Thus, $376_{16}\ 5A_{16} = 9.D7_{16}$ (to three significant figures).

It should be appreciated that even simple division is an extremely difficult task in the unfamiliar hexadecimal system when performed manually. This operation requires the carrying and subtraction of numbers in the hexadecimal system, and ordinarily requires constant referral to the above multiplication table, even for the most skilled mathematician.

An inverse hexidecimal base scale having a label CIH at 29 is located inwardly of and adjacent to the CH scale. The CIH scale is graduated in exactly the same manner as the CH scale, but in the reverse direction. Thus, the hexadecimal numbers 1 through $10_{16}$ are graduated in logarithmically ascending order in a counterclockwise direction along the CIH scale. Each number located on the CIH scale is the reciprocal of the corresponding number on the CH scale. The CIH scale is thus used for calculating the hexadecimal reciprocals of given hexadecimal numbers, along with performing hexadecimal multiplication and division in a manner alternative to that described for the CH scale. The CIH scale is particularly useful in performing multiple operations involving several multiplications or divisions. For example, the product of three numbers $(x)$ $(y)$ $(z)$ is most easily calculated by treating it as $(x\ \ 1/y)z$. This problem is solved by setting hairline 16 of indicator arm 12 at $x$ on the CH scale and hairline 18 of arm 14 at $y$ on the CIH scale. If arm 12 were now moved until hairline 18 were at 1, the product $x$ and $y$ would be at hairline 16 of arm 12 on the CH scale. Instead, however, arm 12 is moved until hairline 18 of arm 14 is at $z$ on the CH scale and the result is read at arm 12 on the CH scale.

EXAMPLE D:

Calculate $0.87_{16} \times 2F_{16} \times 3.C2_{16}$.

Set hairline 16 of arm 12 at 87 on the CH scale, then set hairline 18 of arm 14 at 2F on the CIH scale.

Move arm 12 until hairline 18 is at 3C2 on the CH scale.

Read 5C at hairline 16 of arm 12 on the CH scale. Thus, $0.87_{16} \times 2F_{16} \times 3.C2_{16} = 5C_{16}$ (to three significant figures).

A hexadecimal square scale having a label AH at 30 is located inwardly of and adjacent to the CIH scale. The 360° length of the AH scale contains two successive CH scales. The hexadecimal numbers read from the AH scale correspond to the figures obtained after squaring the number indicated at the same radial on the corresponding CH scale. The index 1 representing the origin of the AH scale is aligned with the indices of the CH and CIH scales; and the angular locations Y and Y′ of decimal numbers X (X is between 1 and 16) corresponding to the hexadecimal labels $\xi$ with reference to the index of the AH scale are given by the following relationships:

$$Y^\circ = 180^\circ (\log_{10}X)(\log_{16}10).$$

$Y^\circ = 180^\circ\,[1+(\log_{10}X)(\log_{16}10)]$. Thus, the hexadecimal representation of each decimal number $X$ between 1 and 16 appears twice on the AH scale, the two locations being 180° apart. If the factors 180° are replaced by L/2 where L is the length of a linear embodiment of this invention as heretofore discussed, then the factors $Y$ and $Y'$ correspond to the distances of the appropriate indicia from the origin of said embodiment. The squares of the hexadecimal number on the CH scale are found on the same radial on the AH scale.

EXAMPLE E:

Evaluate $(25_{16})^2$.

Set hairline 16 of arm 12 at 25 on the CH scale.

Read 559 at the AH scale on the same hairline. Thus, $$25_{16} \times 25_{16} = 559.$$

Similarly, the square roots of hexadecimal numbers on the AH scale are found on the same radial at the CH scale. Care must be taken, however, to insure that the initial number is set at the proper section of the AH scale. This is done by re-expressing each number whose square root is to be calculated into a number between 1 and $100_{16}$ times an even power of $10_{16}$, a familiar operation derived from experience with conventional decimal base slide rules. After factoring out the even power of $10_{16}$, if the remaining factor is between 1 and $10_{16}$ the number is set in the first sector of the AH scale. If the remaining factor is between $10_{16}$ and $100_{16}$, then the number is set in the second sector.

EXAMPLE F:

Evaluate $\sqrt{A90_{16}}$.

Rearrange: $\sqrt{A90_{16}} = \sqrt{A.90_{16} \times 10_{16}{}^2} = 10_{16}\ \sqrt{A.90}$.

Set hairline 16 of arm 12 at A90 on the first section of the AH scale, and read the figures 340 at hairline 16 on the CH scale. Therefore, $$\sqrt{A90_{16}} = 34_{16}.$$

A hexadecimal logarithm scale having a label LH at 32 is located inwardly of and adjacent to the AH scale. The LH scale is a linear scale representing hexadecimal fractions between 0.0 and 1.0. The mantissas of the hexadecimal logarithms of CH scale numbers are found at the same radial on this scale. The scale is divided into 16 major segments of equal length with indicia corresponding to the hexadecimal fractions between 0 and 1.0. The origin of the scale is defined by an index 0 at 33 which is aligned with the indices of the above CH, CIH, and AH scales. The angular location $Y$ of a decimal number $X$ whose hexadecimal representation is $\xi$ with reference to the index of the LH scale is determined by the following relationship:

$$\text{For } 0 \le X < 16,$$
$$Y = 22.5^\circ X.$$

If the factor 22.5° is replaced by L/16, where L is the length of a linear embodiment of the present invention, then $Y$ corresponds to the distance of the appropriate indicia from the origin of the linear embodiment of the calculator.

The LH scale is useful in calculating hexadecimal mantissas of CH scale numbers. To find the logarithm of a hexadecimal number, the number should first be expressed as a figure between 1 and $10_{16}$ times an integral power of $10_{16}$. The mantissa (a positive fraction between 0 and 1) is found by setting the number on the CH scale and reading the mantissa on the LH scale.

EXAMPLE G:

Calculate $\log_{16}(484_{16})$.

$$\log_{16}(484)_{16} = \log_{16}(4.84_{16} \times 10_{16}{}^2),$$
$$= \log_{16}(4.84_{16}) + \log_{16}(10_{16}{}^2),$$
$$= \log_{16}(4.84_{16}) + 2.$$

Set hairline 16 of arm 12 at 484 on the CH scale, and read 8B2 at hairline 16 on the LH scale. Hence, $$\log_{16}(484_{16}) = 0.8B2_{16} + 2 = 2.8B2_{16}.$$

Exponentiation of hexadecimal numbers is achieved using the LH scale in conjunction with the CH scale. To calculate a quantity $x=a^b$, for example, note that $$\log x = b \log a.$$

Therefore, $$x = \text{antilog}\ (b \log a).$$

Thus, the simplest procedure for calculating $x$ is to multiply the logarithm of $a$ by $b$ and then take the antilogarithm of the result.

EXAMPLE H:

Calculate $7A_{16}{}^{\pi}$ $$\log_{16} 7A = \log_{16}(7.A \times 10_{16}) = 1.0 + \log_{16}(7.A)$$

$\log_{16}(7.A) = 0.BB9_{16}$ (from CH and LH scales, as above).

Therefore, $$\log_{16} 7A = 1.BB9$$

Using the CH scale to perform hexadecimal multiplication, $$1.BB9_{16} \times \pi_{16} = 5.718_{16}.$$

Therefore, $$7A_{16}{}^{\pi} = 10_{16}{}^{5.718} = 10_{16}{}^5 \times 10_{16}{}^{0.718} = 10_{16}{}^5\ (\text{antilog } 0.718)$$
$$= 3.6DB_{16} \times 10_{16}{}^5.$$

Face 11 of base member 10 further comprises a series of conventional circular decimal base scales converging inwardly from the above-described hexadecimal scales. A standard decimal base scale having a label C at 34 is located inwardly of the LH scale; and inverse decimal scale having a label CI at 36 is located adjacent the C scale; a decimal square scale having a label A at 38 is located adjacent the CI scale; and finally, a decimal logarithm scale having a label L at 40 is located adjacent the A scale.

As discussed above, conventional hexadecimal numbers are often most conveniently expressed in so-called normalized form. This form is expressed as a hexadecimal fraction between 0.1 and 1.0 times a hexadecimal power of the decimal number 16, which is equivalent to the hexadecimal number 10, i.e., $10_{16}$. A systems analyst required to analyze the dump listing of a computer using hexadecimal arithmetic is constantly required to convert normalized hexadecimal numbers to decimal. The conversion between normalized floating-point hexadecimal numbers and conventional numbers is by no means trivial. A conventional (but not preferred) procedure, using the calculator of this invention, is described in the following example:

EXAMPLE I:

Convert $10_{16}{}^{A}$ to decimal

Convert the hexadecimal power of $10_{16}$ to decimal power of $16_{10}$:

$$10_{16}{}^{A} = (16_{10})10_{10}$$

Then convert the decimal power of $16_{10}$ into a decimal power of $10_{10}$ using the relation:

$\underline{16_{10}{}^{n} = 10_{10}{}^{nLd}}$, where $Ld = \log_{10} 16 = 1.20412_{10}$ The symbol Ld which indicates conversion to decimal is represented by a special index and label Ld at 41 on the C and CI scales. Thus, $$16_{10}{}^{10} = 10_{10}{}^{10Ld} = 10_{10}{}^{12.0412}$$

Re-expressing, $$10_{10}{}^{12.0412} = 10_{10}{}^{12} \times 10_{10}{}^{0.0412}$$

The fractional power of $\mathbf{10_{10}}$ is converted by setting the fraction on the L scale and reading its antilogarithm on the C scale, a procedure well known from experience with conventional decimal base slide rules. Thus, $$10_{10}{}^{0.0412} = 1.1, \text{ and}$$

$$10_{16}{}^{A} = (1.1 \times 10^{12})_{10}.$$

The above conversion is somewhat cumbersome, but it should be appreciated that the conversion is virtually impossible to perform at present without the aid of this invention or a digital computer, because tables for converting hexadecimal numbers to decimal numbers and vice versa, do not exist.

This invention provides scales for rapidly converting hexadecimal powers of $10_{16}$ directly into their decimal equivalents. A preferred arrangement includes a first hexadecimal powers of 10 scale having a label 16S at 42, and a second scale having a label 16S1 at 43. These scales are shown as the innermost scales on face 11 of base member 10. The scales comprise two series of numbers representing hexadecimal powers of the decimal number 16, i.e., the hexadecimal number 10. The numbers appearing on the 16S and 16S1 scales correspond to the hexadecimal exponents M of the value $10_{16}{}^{M}$, where M is a hexadecimal integer. A preferred arrangement of this scale contains a first series of positive hexadecimal "units" 1, 2, 3, 4, 5, 6, 7, 8, 9, A, B, C, D, E, and F on the 16S scale; and a second series of hexadecimal "tens" 10, 20, 30, 40, 50, 60, 70, 80, 90, A0, B0, C0, D0, E0, and F0 on the 16S1 scale. Positive hexadecimal powers of $10_{16}$ are converted into their decimal equivalents using the 16S and 16S1 scales in conjunction with the conventional decimal base C scale; and negative hexadecimal powers of $10_{16}$ are converted to their decimal equivalents using the 16S and 16S1 scales with the CI scale. Thus, referring to the example problem above, the decimal equivalent of $10_{16}{}^{A}$ is $$1.1 \times 10_{10}{}^{12},$$

which is determined immediately by setting the hairline at A on the 16S scale and reading the significant figures at the hairline on the C scale, viz., 1.1.

The indicia of the 16S scale are preferably characterized by three numbers: a radial number indicating the hexadecimal power of 10, a positive number corresponding to the positive power of 10 (decimal base) to which the C scale number corresponds, and a negative number corresponding to the negative power of 10 (decimal base) to which the CI scale number corresponds. The numbers read from the C or CI scales represent numbers between 1 and $10_{10}$ (decimal base). Thus, in the preferred embodiment, A12/—*a*13 is interpreted as follows: A is a hexadecimal number equivalent to 10 in decimal, and represents the positive or negative hexadecimal power of $10_{16}$ whose decimal equivalent is required. The long bar represents the corresponding indicial mark upon which the hairline of the indicator means is set. The integer 12 corresponds to the positive power of $10_{10}$ by which the factor on the C scale must be multiplied to yield the correct final result if $10_{16}{}^{A}$ is required, as in the foregoing example problem. The integer −13 corresponds to the negative power of $10_{10}$ by which the factor on the CI scale must be multiplied to yield the correct final result if $10_{16}{}^{-A}$ is required. If the hairline of the indicating means is aligned with said example indicia, the value on the same radial at the C scale yields the immediate result $$10_{16}{}^{A} = 1.1 \times 10_{10}{}^{12}.$$

Similarly, at the CI scale the result is $$10_{16}{}^{-A} = 9.07 \times 10_{10}{}^{-13}.$$

Any hexadecimal power of 10 between and including the numbers $10_{16}{}^{-FF}$ and $10_{16}{}^{FF}$ is converted to its decimal form using the 16 S scale, since any such number may be represented as a set of factors each of which individually appears on the scale. Thus, for example, $$10_{16}{}^{44} = 10_{16}{}^{40} \times 10_{16}{}^{4}.$$

This latter product may be calculated as described earlier using the indicia corresponding to 40 and 4 on the 16S and 16S1 scales. The product of the resultant values is then calculated as described earlier using the C scale. Alternatively, a number not appearing on the 16S scales, such as $10_{16}{}^{44}$, can be converted into its decimal equivalent by adding intervals corresponding to its factors, e.g., $10_{16}{}^{40}$ and $10_{16}{}^{4}$, on the 16S scales and reading the result on the C scale. For negative powers of 10, results are read on the CI scale.

The angular locations $Y$ of the hexadecimal powers M with reference to the 16S scale index 0 at 44 are determined by the following relationship:

$$Y^{\circ} = 360° \text{ [mantissa of } (\log_{10} X)]$$

where X is the decimal representation of $10_{16}{}^{M}$, and M represents a positive hexadecimal integer.

Thus, for hexadecimal power 2 located on the 16S scale, $$X = 10_{16}{}^{2} = 256_{10},$$

and location $Y = 360°\text{ [mantissa of} \{\log_{10}(256_{10})\}].$ $= 360°\text{ [mantissa of } (2+0.408)]$ $= 360° (0.408) = 147.2°$ in a clockwise direction from index 0. If the factor 360° in the above equation is replaced by L, where L is the length of a linear embodiment of this invention, then the factor $Y$ corresponds to the distances of the appropriate indicia from the origin of said embodiment. Similarly, the angular locations $Y$ of negative hexadecimal powers with reference to the scale index are determined by the above relationship, but their decimal equivalents are read on the CI scale.

Reverse face 22 of base member 10 comprises a series of inwardly converging concentric circular scales beginning with an outermost hexadecimal base scale having a label CH at 45. Located inwardly from the CH scale is a spiral decimal conversion scale having a plurality of labels DM, where M preferably represents a number from −3 to +4, including 0. The decimal conversion scales include:

D4 scale: decimal numbers between $16^3 = 4{,}096$ and $16^4 = 65{,}536$

D3 scale: decimal numbers between $16^2 = 256$ and $16^3 = 4{,}096$

D2 scale: decimal numbers between $16^1$ and $16^2 = 256$

D1 scale: decimal numbers between $16^0 = 1$ and $16^1$

D0 scale: decimal numbers between $16^{-1} = 0.0625$ and $16^0$

D–1 scale: decimal numbers between $16^{-2} = 0.00390625$ and $16^{-1}$

D–2 scale: decimal numbers between $16^{-3} = 2.44140625 \times 10^{-4}$ and $16^{-2}$

D–3 scale: decimal numbers between $16^{-4} = 1.52587890625 \times 10^{-5}$ and $16^{-3}$ The spiral D scales enable hexadecimal numbers preferably between $10^4$ and $10^{-4}$ to be readily converted into their decimal equivalents. Conversely, the scales can be used to convert decimal numbers preferably between $16^4$ and $16^{-4}$ into their hexadecimal equivalents. The angular locations $Y$ of the decimal numbers $X$, where $16^0_{10} \leq X < 16^M$, with reference to a particular D scale index of origin are determined by the following equation:

$$Y^\circ = 360^\circ \text{ [fractional part of } \{(\log_{10}X)(\log_{16}10)\}]$$

Each such decimal number $X$ lies in the range of one D scale. $X$ is found on the DM scale if $X$ lies between $16_{10}^{-1}$ and $16_{10}^{M}$. Thus, where $X$ is the decimal number 20, which lies between $16^1$ and $16^2$ (i.e., $M=2$), the number 20 is found on the D2 scale. The angular location $Y$ of 20 with reference to the D0 scale index "1" is determined from the above equation. That is, $$\begin{aligned} Y &= 360^\circ \text{ [fractional part of } \{(\log_{10}\mathbf{20})(\log_{16}\mathbf{10})\}] \\ &= 360^\circ \text{ [fractional part of } \{(1.30103)(0.8305)\}] \\ &= 360^\circ \text{ [fractional part of } (1.081)] \\ &= 360^\circ (0.081) = 29.15^\circ \end{aligned}$$

Therefore, the decimal number 20 is located 29.15° in a clockwise direction from D0 scale index.

Similarly, the relative positions of decimal numbers $X$, where $16^{-M} < X \leq 16^0$, with reference to a particular fractional D scale index of origin are determined by the following relationship:

$$Y = 360^\circ \{\text{ positive fractional part of } [(\log_{10}X)(\log_{16}\mathbf{10})]\}$$

Each such fractional decimal number X lies in the range of one fractional D scale. $X$ is found on the D–M scale if $16^{M-1} < X \leq 16^M$, where $M$ represents a negative integer and 0. Thus, where $X$ is a fractional decimal number 0.003, which lies between $16^{-2}$ and $16^{-3}$ (i.e., $M=-2$), the number 0.003 is found on the D–2 scale. The angular location $Y$ of 0.003 with reference to the D0 scale index "1" is determined from the above equation as follows:

$$Y = 360^\circ \{\text{positive fractional part of } [\log_{10}\mathbf{0.003})(\log_{16}\mathbf{10})]\}$$

$$Y = 360^\circ \{\text{positive fractional part of } [(-2.5229)(0.8305)]\}$$

$$Y = 360^\circ \{\text{positive fractional part of } (-2.098)\}.$$

The positive fractional part of (−2.098)
= positive fractional part of (−3 +0.902)
= 0.902. Thus, $$Y = 360^\circ (0.902) = 325^\circ$$

clockwise from the D0 scale index. In the above equations, the factor 360° may be replaced by L which represents the length of a linear embodiment of this invention.

To convert a hexadecimal number $X$ to its decimal equivalent, the hexadecimal number is set on the CH scale, and its decimal equivalent is read on an appropriate DM scale. Preferably, before converting to decimal, a hexadecimal number should first be expressed as a fraction between $0.1_{16}$ and 1.0 times an integral power of $10_{16}$. The exponent of the latter factor will then determine the proper DM scale label.

EXAMPLE J:

Convert $6C8_{16}$ to decimal.

$$6C8_{16} = 0.6C8_{16} \times 10_{16}^{3}$$

The exponent "3" of $10_{16}$ indicates that the result is read on the D3 scale. Set the hairline of either arm at 6C8 on the CH scale and read 1,738 on the D3 scale. Thus, $$6C8_{16} = 1.738_{10}.$$

The D scales of this invention are further useful in converting decimal numbers preferably in the range between 65,536 and $1.525 \times 10^{-5}$ to their hexadecimal equivalents by setting indicator arm 24 at the appropriate value on the D scale and reading the equivalent hexadecimal value on the CH scale with the hexadecimal point fixed before the first significant integer. The suitable hexadecimal exponent is found from the D scale label.

EXAMPLE K:

Convert $2 \times 10_4^{-10}$ to hexadecimal

Set the hairline of either arm at 0.0002 on the D–3 scale and Read the result on the CH scale, viz., $$2 \times 10_4^{-10} = 0.D1B_{16} \times 10_{16}^{-3}$$

The exponent "−3" of $10_{16}$ is derived from the D–3 scale label.

All hexadecimal or decimal fractions between about 0.01 and 1.0 may alternatively be converted to the other base using the L and LH scales on the front of the calculator. Thus, by setting the hairline of either indicator arm at a hexadecimal fraction on the LH scale immediately yields its decimal equivalent on the L scale, and vice versa.

The D scales of this invention are used in combination with the 16S scale to convert hexadecimal floating-point number to decimal.

EXAMPLE L:

Convert $0.6A8_{16} \times 10_{16}^{F}$ to its decimal equivalent.

First, convert $0.6A8_{16}$ to decimal using either the D scales in combination with the CH scale, or the LH scale in combination with the L scale, as above:

$$0.6A8_{16} = 0.416_{10}$$

Next, convert $10_{16}^{F}$ to decimal using the 16S scale and the C scale, as above:

$$10_{16}^{F} = 1.153 \times 10_{10}^{18}$$

Finally, multiplying using arms 12 and 14 in conjunction with the C scale yields $$0.416_{10} \times 1.153_{10} \times 10_{10}^{18} = 0.480_{10} \times 10_{10}^{8}. \text{ Thus,}$$

$$0.6A8_{16} \times 10_{16}^{F} = 0.480_{10} \times 10_{10}^{18}.$$

Similarly, a decimal floating-point number is converted to hexadecimal.

EXAMPLE M:

Convert $0.56_{10} \times 10_{10}^{15}$ to its hexadecimal equivalent.

First, using the 16S scale in combination with the CI scale, convert the factor $10_{10}^{15}$ to hexadecimal:

$$4.5 \times 10_{10}^{15} = 10_{16}^{D} \text{ (from the D15/16 symbol on the 16S scale)}$$

Thus, $$10_{10}^{15} = 0.2218_{10} \times 10_{16}^{D}$$

Re-expressing and multiplying, $$0.56_{10} \times 0.2218_{10} \times 10_{16}^{D} = 0.1243_{10} \times 10_{16}^{D}$$

Finally, the factor 0.1243 is converted to hexadecimal using the D0 and CH scales. Thus, $$0.56_{10} \times 10_{10}^{15} = 0.1F98 \times 10_{16}^{D}.$$

It should be appreciated that the use of the CH scale in combination with the D scales on reverse face 22 of the calculator provides a rapid means of performing hexadecimal or decimal multiplication and division operations and converting the result to the opposite base. For example, fixed-point decimal multiplication and division operations can be performed using indicator arms 23 and 24 in conjunction with the decimal conversion scales. The resultant decimal value is then converted to hexadecimal form using the CH scale. Conversely, multiplication and division of hexadecimal numbers can be performed using the CH scale. The resultant value is immediately converted to its decimal representation using the decimal conversion scales.

The present invention has been described in the context of a circular calculating structure having a plurality of hexadecimal and decimal base scales in a preferred arrangement thereon. It is to be understood, however, that the scope of this invention is not limited thereto, and that various changes may be made on the structure of the calculator and the arrangement of the scales disclosed herein without departing from the scope of this invention.

What is claimed is:

1. A calculator for making numerical calculations in a hexadecimal base number system comprising:

a. base means;

b. a hexadecimal base scale on said base means having hexadecimal base numbers graduated and arranged such that the length of the scale is divided into a plurality of segments defined by indicia corresponding to the hexadecimal numbers one through 10, the scale segments having graduations corresponding to fractional portions of each of the said hexadecimal numbers, and the relative positions of the numbers with reference to the origin of the scale being a function of the hexadecimal logarithms of the numbers; and c. indicator means movable relative to the base means for adding intervals corresponding to selected portions of the said hexadecimal base scale and indicating resultant values on said scale.

2. A calculator according to claim 1 wherein the said graduations are selected to correspond to at least each two-digit hexadecimal number in the range of the scale.

3. A calculator according to claim 1, wherein the said indicator means includes first and second movable members adapted to move relative to each other and relative to the base means.

4. A calculator according to claim 1, wherein:

a. the base means comprises a substantially circular member; and b. the indicator means comprise first and second radial indicator arms attached to the center of the base means, the arms being adjustable in their angular relationship to each other and rotatable relative to the base means.

5. A calculator according to claim 1, including an inverse hexadecimal base scale on said base means having an effective length equal to that of the said hexadecimal base scale and having hexadecimal base numbers graduated in descending order relative to the hexadecimal base scale and arranged such that the length of the said inverse hexadecimal scale is divided into a plurality of segments defined by indicia corresponding to the hexadecimal numbers one through 10, the said scale segments having graduations corresponding to fractional portions of each of the said hexadecimal numbers, and the relative positions of the numbers with reference to the origin of the scale being a function of the hexadecimal logarithms of the numbers;

and wherein the said indicator means is movable relative to the said base means for adding intervals corresponding to selected portions of either of said hexadecimal base and inverse hexadecimal base scales and indicating resultant values on either of said scales.

6. A calculator according to claim 1 including a hexadecimal square scale on said base means having an effective length equal to that of the hexadecimal base scale and having hexadecimal base numbers graduated and arranged such that the first and second halves of the said hexadecimal square scale are respectively divided into a plurality of segments defined by indicia corresponding to the hexadecimal numbers one through 10, the said scale segments having graduations corresponding to fractional portions of each of the said hexadecimal numbers, and the relative positions of the numbers with reference to the origin of each half of the scale being a function of the hexadecimal logarithms of the numbers;

and wherein the said indicator means is movable relative to the said base means for adding intervals corresponding to selected portions of either of said hexadecimal base and hexadecimal square scale and indicating resultant values on said scales.

7. A calculator according to claim 1 including a hexadecimal logarithm scale on said base means having an effective length equal to that of the hexadecimal base scale and having hexadecimal base fractions graduated linearly and arranged such that the length of the said hexadecimal logarithm scale is divided into a plurality of segments defined by indicia corresponding to hexadecimal fractions between 0 and 1, the said scale segments having graduations corresponding to fractional portions of each of the said hexadecimal fractions;

and wherein the said indicator means is movable relative to the said base means for adding intervals corresponding to selected portions of either of said hexadecimal base and hexadecimal logarithm scales and indicating resultant values on said scales.

8. A calculator according to claim 1 including a plurality of decimal conversion scales on said base means, each scale having an effective length equal to that of the hexadecimal base scale with decimal base numbers graduated from $16^{M-1}$ to $16^{M}$ where M represents a positive integer, a negative hexadecimal integer, or zero, the relative positions of the said numbers with reference to the origin of each scale being a function of the hexadecimal logarithms of the numbers;

and wherein the said indicator means is movable relative to the said base means for adding intervals corresponding to selected portions of said hexadecimal base and decimal conversion scales and indicating resultant values on said hexadecimal base and decimal conversion scales.

9. Slide rule calculator means in accordance with claim 1, further comprising, in combination:

scale means bearing indicia in logarithmic intervals of logarithm base 10;

scale means bearing indicia in equal intervals modulus 16 representing number base 16;

scale means bearing indicia in equal intervals modulus 10 representing number base 10; and in which said indicator means includes cursor means movable relative to said scale means such that mathematical operations can be performed interchanging said bases.

10. Slide rule means of claim 9, wherein:

said scale means are circular and concentric.

11. Slide rule means of claim 10, wherein:

said cursor means includes a pair of cursor elements rotatable about the common center of said concentric scale means.

12. Slide rule means of claim 9, wherein:

said logarithm base 16 scale means include $k$ scale elements corresponding to a range of $16^{k_1}$ to $16^{k_2}$, where $k_2$ is greater than $k_1$, $k_2-k_1=k$ and $k$ is a positive integer.

13. Slide rule means of claim 12, wherein:

$k$ is 8, $k_1$ is $-4$ and $k_2$ is $+4$.

14. Slide rule calculator means in accordance with claim 1, further comprising, in combination:

scale means bearing indicia representing number base 10 in logarithmic intervals of logarithm base 10;

scale means for converting indicia representing number base 16 to indicia representing number base 10; and in which said indicator means includes cursor means movable relative to said scale means such that mathematical operations can be performed interchanging said bases.

15. The slide rule means of claim 14, wherein:

said conversion scale means includes a scale element bearing indicia representing number base 10 in logarithmic intervals of logarithm base 16.

16. The slide rule means of claim 15, wherein:

said conversion scale means include $k$ said scale elements corresponding to a range of $16^{k_1}$ to $16^{k_2}$, where $k_2$ is greater than $k_1$, $k_2-k_1=k$ and $k$ is a positive integer.

* * * * *